United States Patent
Urzi et al.

(10) Patent No.: US 9,178,776 B2
(45) Date of Patent: Nov. 3, 2015

(54) ARRANGEMENT AND METHOD

(71) Applicants: STMicroelectronics (Grenoble 2) SAS, Grenoble (FR); STMicroelectronics S.r.l., Agrate Brianza (IT)

(72) Inventors: Ignazio Antonino Urzi, Voreppe (FR); Rene Peyrard, Voiron (FR); Daniele Mangano, San Gregorio di Catania (IT)

(73) Assignees: STMICROELECTRONICS (GRENOBLE 2) SAS, Grenoble (FR); STMICROELECTRONICS S.R.L., Agrate Brianza (IT)

( * ) Notice: Subject to any disclaimer, the term of this patent is extended or adjusted under 35 U.S.C. 154(b) by 149 days.

(21) Appl. No.: 13/789,445

(22) Filed: Mar. 7, 2013

(65) Prior Publication Data

US 2013/0268990 A1    Oct. 10, 2013

(30) Foreign Application Priority Data

Apr. 5, 2012 (GB) .................................. 1206100.8

(51) Int. Cl.
| | |
|---|---|
| *H04L 12/28* | (2006.01) |
| *G01R 31/08* | (2006.01) |
| *H04L 12/24* | (2006.01) |
| *H04L 12/26* | (2006.01) |
| *H04L 12/815* | (2013.01) |
| *H04L 12/813* | (2013.01) |
| *H04L 12/853* | (2013.01) |

(52) U.S. Cl.
CPC ........ *H04L 41/5038* (2013.01); *H04L 41/0896* (2013.01); *H04L 41/5025* (2013.01); *H04L 43/0882* (2013.01); *H04L 47/20* (2013.01); *H04L 47/22* (2013.01); *H04L 47/2416* (2013.01)

(58) Field of Classification Search
CPC ............................... H04L 12/28; G01R 31/08
USPC ......................... 725/95, 96, 98, 119
See application file for complete search history.

(56) References Cited

U.S. PATENT DOCUMENTS

| | | | |
|---|---|---|---|
| 2008/0225715 A1* | 9/2008 | Plamondon | .......... 370/232 |
| 2010/0281144 A1 | 11/2010 | Mangano et al. | |

FOREIGN PATENT DOCUMENTS

WO      2005/003961 A2    1/2005

OTHER PUBLICATIONS

Great Britain Search Report, dated Jul. 25, 2012, for Great Britain application No. 1206100.8, 3 pages.

\* cited by examiner

*Primary Examiner* — Kieu Oanh T Bui
(74) *Attorney, Agent, or Firm* — Seed IP Law Group PLLC

(57) ABSTRACT

A method includes providing at least one target bandwidth for bandwidth usage on an interconnect, the target bandwidth being for traffic associated with a traffic initiator. The method also includes measuring a served bandwidth and resetting the measuring of served bandwidth in response to an occurrence of an event.

33 Claims, 7 Drawing Sheets

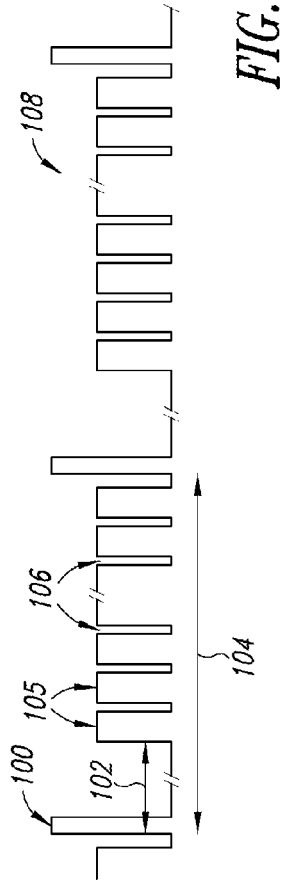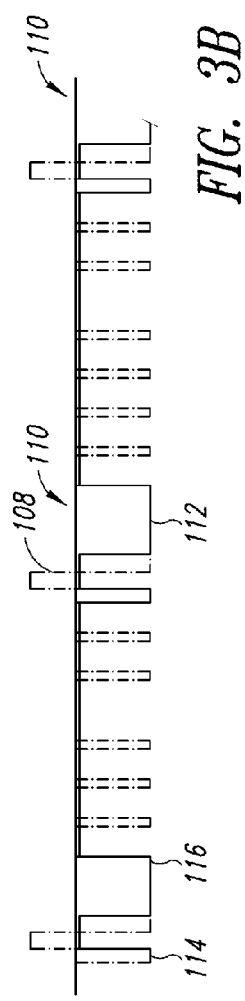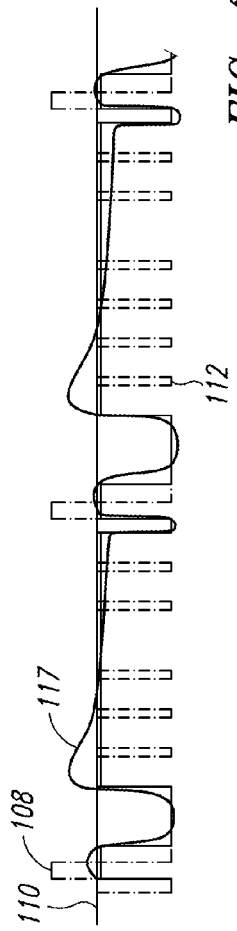

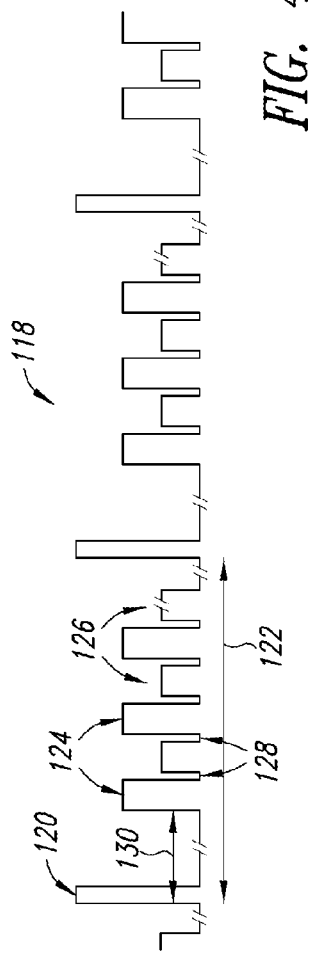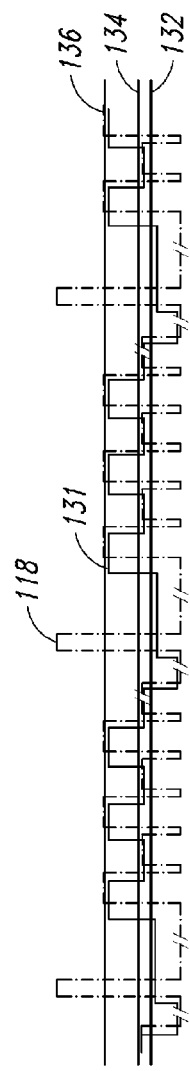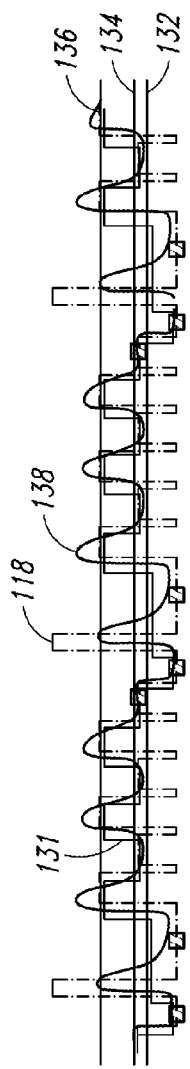

ARRANGEMENT AND METHOD

BACKGROUND

1. Technical Field

Some embodiments relate to arrangements and methods to allocate target bandwidth, which may be used for quality of service management.

2. Description of the Related Art

Ever increasing demands are being placed on the performance of electronic circuitry. For example, consumers expect multimedia functionality on more and more consumer electronic devices. By way of example only, advance graphical user interfaces drive the demand for graphics processor units (GPU). HD (High definition) video demand for video acceleration is also putting an increased demand for performance on consumer electronic devices. There is a trend to provide 2D and 3D TV on an ever increasing number of consumer electronic devices.

In electronic devices, there may be two or more initiators which access one or more targets via a shared interconnect. Access to the interconnect is managed in order to provide a desired level quality of service for each of the initiators. Broadly, there are two types of quality of service management: static and dynamic. The quality of service management attempts to regulate bandwidth or latency of the initiators in order to meet the overall quality of service required by the system.

BRIEF SUMMARY

According to an aspect, there is provided a method comprising: providing at least one target bandwidth for bandwidth usage on an interconnect, said target bandwidth being for traffic associated with a traffic initiator; measuring a served bandwidth; and resetting said measuring of served bandwidth in response to an occurrence of an event.

The measuring may use a bandwidth counter and said resetting may comprise resetting said bandwidth counter.

The method may comprise comparing served bandwidth and target bandwidth for said traffic. The target bandwidth may be the bandwidth required by the initiator.

The method may comprise using said comparing to provide feedback to a quality of service manager.

The comparing of bandwidth may be reset in response to an event.

The comparing of bandwidth may be reset in response to one of a beginning of task; an end of a task; a beginning of a frame; and an end of a frame.

The method may comprise providing a plurality of target bandwidths.

Traffic provided by the traffic initiator may comprise video traffic.

The method may comprise setting a first target bandwidth for a vertical blanking period and at least one further target bandwidth for an active part of a frame.

The resetting may be carried out at an end of the vertical blanking period and at an end of the active part of the frame.

The at least one further target bandwidth may comprise a target bandwidth for even lines of the frame and a different target bandwidth for odd lines of the frame.

The resetting may be carried out at an end of the vertical blanking period, at an end of each even line and at an end of each odd line.

The method may comprise outputting traffic by said traffic initiator and controlling of a traffic shape by said traffic initiator.

The method may comprise issuing traffic from said traffic initiator under control of a processor.

The traffic sequence may comprise one of video decoding traffic and graphics traffic.

The method may comprise controlling a shape of said traffic by said processor.

According to another aspect, there is provided an arrangement comprising: an interconnect configured to convey traffic associated with at least one initiator, said interconnect having at least one interface configured to interface with said at least one traffic initiator, at least one target bandwidth being provided for traffic associated with a respective traffic initiator on said interconnect; and a measurement unit configured to measure a served bandwidth associated with said respective traffic initiator, said measurement unit being configured to be reset in response to an occurrence of an event.

The measurement unit may comprise a bandwidth counter.

The arrangement may comprise a comparing unit configured to compare said served bandwidth and target bandwidth for said traffic.

The comparing unit may be configured to provide feedback to a quality of service manager.

The comparing unit may be configured to be reset in response to an event.

The event may comprise one of a beginning of task, an end of a task, a beginning of a frame, and an end of a frame.

A plurality of target bandwidths may be provided.

The respective traffic initiator may be associated with video traffic.

A first target bandwidth for a vertical blanking period and at least one further target bandwidth for an active part of a frame may be provided.

The measurement unit may be configured to be reset at an end of the vertical blanking period and at an end of the active part of the frame.

The at least one further target bandwidth comprises a target bandwidth for even lines of a frame and a different target bandwidth for odd lines of a frame.

The measurement unit may be configured to be reset at an end of the vertical blanking period, at an end of each even line and at an end of each odd line.

The traffic initiator may be configured to output traffic and control a shape of said traffic.

The traffic initiator may be configured to issue traffic under control of a processor.

The traffic may comprise one of a video decoding traffic and graphics traffic.

According to another aspect, there is provided an integrated circuit or die comprising an arrangement as described above.

According to another aspect, there is provided a multimedia device comprising the arrangement as described above.

According to another aspect, there is provided a method comprising: providing a target bandwidth for bandwidth usage on an interconnect, said target bandwidth being for a traffic initiator, determining a bandwidth usage, and changing a target bandwidth in response to an occurrence of an event.

BRIEF DESCRIPTION OF THE SEVERAL VIEWS OF THE DRAWINGS

For a better understanding of some embodiments, reference will now be made by way of example only to the accompanying Figures. Non-limiting and non-exhaustive embodiments are described with reference to the following drawings, wherein like labels refer to like parts throughout the various views unless otherwise specified. One or more embodiments are described hereinafter with reference to the accompanying drawings in which:

FIGS. 3a, 3b and 3c show a first example of real time video traffic;

FIGS. 4a, 4b and 4c show a second example of real time video traffic;

DETAILED DESCRIPTION

Figure 1:
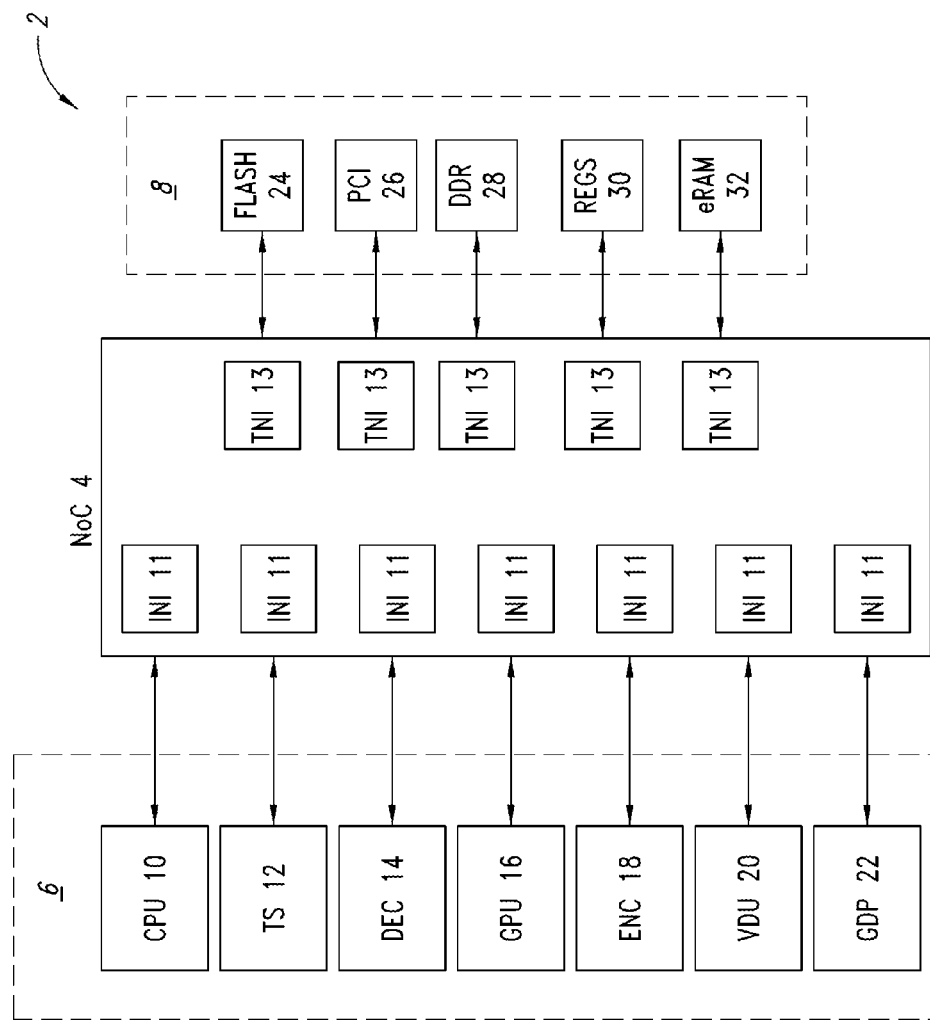
FIG. 1 shows a device in which embodiments may be provided.

Reference is made to FIG. 1, which schematically shows part of an electronics device 2. At least part of the electronics device may be provided on an integrated circuit. In some embodiments all of the elements shown in FIG. 1 may be provided in an integrated circuit. In alternative embodiments, the arrangement shown in FIG. 1 may be provided by two or more integrated circuits. Some embodiments may be implemented by one or more dies. The one or more dies may be packaged in the same or different packages. Some of the components of FIG. 1 may be provided outside of an integrated circuit or die.

The device 2 comprises a network on chip NoC 4. The NoC 4 provides an interconnect and allows various traffic initiators (sometimes referred to as masters or sources) 6 to communicate with various targets (sometimes referred to as slaves or destinations) 8 and vice versa. By way of example only, the initiators may be one or more of a CPU (Computer Processor Unit) 10, TS (Transport Stream Processor) 12, DEC (Decoder) 14, GPU (Graphics Processor Unit) 16, ENC (Encoder) 18, VDU (Video display unit) 20 and GDP (Graphics Display Processor) 22.

It should be appreciated that these units are by way of example only. In alternative embodiments, any one or more of these units may be replaced by any other suitable unit. In some embodiments, more or less than the illustrated number of initiators may be used.

By way of example only, the targets comprise a flash memory 24, a PCI (Peripheral Component Interconnect) 26, a DDR (Double Data Rate) memory 28, REGS (one or more registers) 30, and an eRAM 32 (embedded random access memory). It should be appreciated that these targets are by way of example only and any other suitable target may alternatively or additionally by used. More or less than the number of targets shown may be provided in other embodiments. The NoC 4 has a respective interface 11 for each of the respective initiators. In some embodiments, two or more initiators may share an interface. In some embodiments, more than one interface may be provided for a respective initiator. Likewise an interface 13 is provided for each of the respective targets. In some embodiments, two or more targets may share an interface. In some embodiments, more than one interface may be provided for a respective target.

Some embodiments will now be described in the context of consumer electronic devices and in particular consumer electronic devices which are able to provide multimedia functions. However, it should be appreciated that other embodiments can be applied to any other suitable electronic device. That electronic device may or may not provide a multimedia function. It should be appreciated that some embodiments may be used in specialized applications other than in consumer applications or in any other application.

Embodiments may be for extended multimedia applications (Audio, video, etc). Some embodiments may be used in any application where multiple different blocks providing traffic are supported by a common interconnect and are arbitrated in order to satisfy a desired Quality of Service (QoS).

Quality of service management is used to manage the communications between the initiators and targets via the NoC 4. The QoS management may be static or dynamic.

Some examples of static QoS management are transaction issue regulation, regulation of outstanding transactions, and weighted round robin.

In a transaction, issue regulation, such as used in AXI (Advanced Extensible Interface), the initiator is limited to a fixed upper bandwidth. Such an arrangement may be useful for a master where there is a defined upper bandwidth that is not usually exceeded. However, such a system is not arranged to use spare bandwidth in a lightly loaded system.

Regulation of outstanding transactions is again used by AXI. The master or source is assigned a high number of outstanding transactions. This may prevent queues backing up in the interconnect with pending outstanding transactions. In some embodiments this may lead to a coarse control to get a finer tuning of the quality of service.

With weighted round robin, each master or source is assigned a weight that is a function of the target bandwidth. This may provide an efficient distribution of system available bandwidth. However, this method assumes that the desired bandwidth is received.

Generally, static QoS based techniques allow the limitation of a master or initiator to a fixed upper bandwidth. However, generally such techniques do not control the lower bandwidth. Static QoS methods may not react to situations where the master or source gets less than the defined bandwidth.

With dynamic quality of service management, a closed loop control is used (as opposed to the open loop control of static QoS management). Dynamic QoS management may have measurement hardware and/or a regulation algorithm. Examples of dynamic QoS management are a dynamic priority scheme or a self-adjusting weighted round robin scheme. In these schemes, the priority or weight of each transaction is dynamically raised and/or lowered to attempt to maintain a long term average latency or bandwidth. In some embodiments, long term may be over the period of a video frame or the like.

In embodiments, a link may be provided with real traffic behavior. With the known arrangements, the master or initiators usually do not consume regularly their target bandwidth. Consider the example of the real time video display. Real time video display may not issue traffic for most of the VBI (Vertical Blanking Interval). The VBI is also known as the vertical interval or the blank. This is the time difference between the last line of one frame and the beginning of the first line of the next frame. During the VBI, an incoming data stream is not displayed on the screen.

In some embodiments, measurement hardware is provided. The measurement hardware will be dynamically reset in order to ensure that no errors are introduced. In some embodiments, the bandwidth or latency is computed only when the master or initiator is active. When the master or initiator does not issue traffic because the master or initiator is idle, the measurement is on reset. In other words, during the VBI or when a frame is already decoded, the measurement will be reset.

The shape or pattern of the traffic issued by an initiator or master will depend on the function of that initiator or master and/or the use of the traffic.

One example of a category of traffic is hardware real time traffic. In some embodiments, once a master or initiator is configured for a given use case, the traffic shape or pattern over a video frame period may be defined and may not change over different frames. In some embodiments the traffic shape or pattern may change if the configuration is changed. In some embodiments, for each new frame, the same traffic shape or pattern is issued by the initiator or master. This may be without any software intervention, in some embodiments. In some embodiments the traffic shape or pattern may be independent from the value of the data. In some embodiments, the traffic shape or pattern may be under the control of the initiator or master.

In some embodiments, the traffic from a master or initiator may be input to memory or go from memory to output. Some traffic may be from memory to memory.

Examples of hardware real time traffic may be real time video processing and video display traffic.

Another example of a category of traffic may be CPU driven traffic. In some embodiments, the issuance of each new traffic sequence will be under the control of a CPU. That CPU may for example be a host CPU. In some embodiments, the traffic shape may depend on the value of the data. Some examples of this type of traffic include memory to memory traffic. Specific examples are video decoder traffic and/or graphic processing traffic.

Reference is made to FIGS. 3a-3c, which show an example of real time video traffic. In particular, FIG. 3a shows native traffic pattern 108 and FIG. 3b shows regulated traffic.

Reference is first made to FIG. 3a. The peak traffic is referenced 100. This is where FIFOs (first-in-first-out) buffers are prefilled at the start of the VBI. This is followed by the rest of the VBI 102 where there is no traffic. This is followed by the odd and even lines of data 105. Each odd and even line and vice versa is separated by a HBI (Horizontal Blanking Interval) 106 where no traffic is provided. The period 104 of the traffic starts just before the prefilling of the FIFOs and ends at the corresponding point at the end of the cycle.

In embodiments, the quality of service regulation may attempt to achieve a target bandwidth which is the full active line average bandwidth. The peak traffic may be spread over the time of the VBI period. In some embodiments, the odd and even line traffic may be spread over the HBI period.

In FIG. 3b, the underlying native traffic pattern 108 is shown for reference. The target bandwidth 110 represents a constant bandwidth level. The desired traffic shape is referenced 112 and is shown by the hatched line. This desired traffic shape has no peak during the VBI period and has an average traffic level during the active odd and even lines. In order to achieve this, in some embodiments, bandwidth counters are reset during a frame. In the example shown in FIG. 3b, the bandwidth counters are reset at the beginning of the frame, referenced 114 and reset at the end of the VBI interval, referenced 116.

Reference is made to FIG. 3c which shows the target bandwidth 110, the desired traffic shape 112 and the native traffic 108, as shown in FIG. 3b. Shown in dotted lines and referenced 117 shows a situation where the reset of FIG. 3b is not applied. As can be seen, a peak of traffic may occur if the reset does not occur before the active lines. This peak may be above the target bandwidth. This undesired peak traffic may disturb the real time traffic of other traffic initiators. Some embodiments may avoid this peak.

Reference is made to FIGS. 4a-4c, which show real time video with a 4:2:0 video format. The native traffic is shown in FIG. 4a and the regulated traffic is shown in FIG. 4b.

Reference is first made to FIG. 4a. The native traffic 118 comprises peak traffic where the FIFOs are prefilled at the start of the VBI. This is referenced 120 and is as described generally previously. The odd line traffic 124 provides chroma and luma information. The even line traffic 126 comprises luma information only. The odd and even line traffic is separated by HBI periods 128. The period 122 of the frame is as described in relation to FIG. 3a. The VBI period 130 is as previously described.

Embodiments aim to spread the peak traffic over the VBI period. Embodiments also aim to spread the odd and even line traffic over the HBI period.

In this regard, reference is made to FIG. 4b which shows the regulated traffic, referenced 131 and shown in dotted lines. Again, the native traffic 118 is shown for reference. The traffic has a first target bandwidth 132, a second target bandwidth 134 and a third target bandwidth 136. The lowest target bandwidth 132 is for the peak traffic spread over the VBI period. The second highest target bandwidth 134 is for the even line traffic and the highest target bandwidth 136 is for the odd line traffic. In this embodiment, the bandwidth counter is reset before the VBI period and before each line. Thus, each time the bandwidth counter is reset, the new target bandwidth value or quality of service is applied. The regulated traffic shape as shown has no peak during the VBI and has an average traffic of the lowest target level. The average traffic during the active lines will move between two additional distinct values depending on the parity of the lines and as defined by the two highest target bandwidth values.

Reference is made to FIG. 4c which shows the target bandwidths 132, 134 and 136, the desired traffic shape 131 and the native traffic 118, as shown in FIG. 4b. Shown in dotted lines and referenced 138 shows a situation where the reset of FIG. 4b is not applied. As can be seen, a peak of traffic may occur if the reset does not occur or target bandwidth switching does not occur before each separated video period. This peak may be above the respective target bandwidth. This undesired peak traffic may disturb the real time traffic of other traffic initiators. Some embodiments may avoid this peak.

Figure 2:
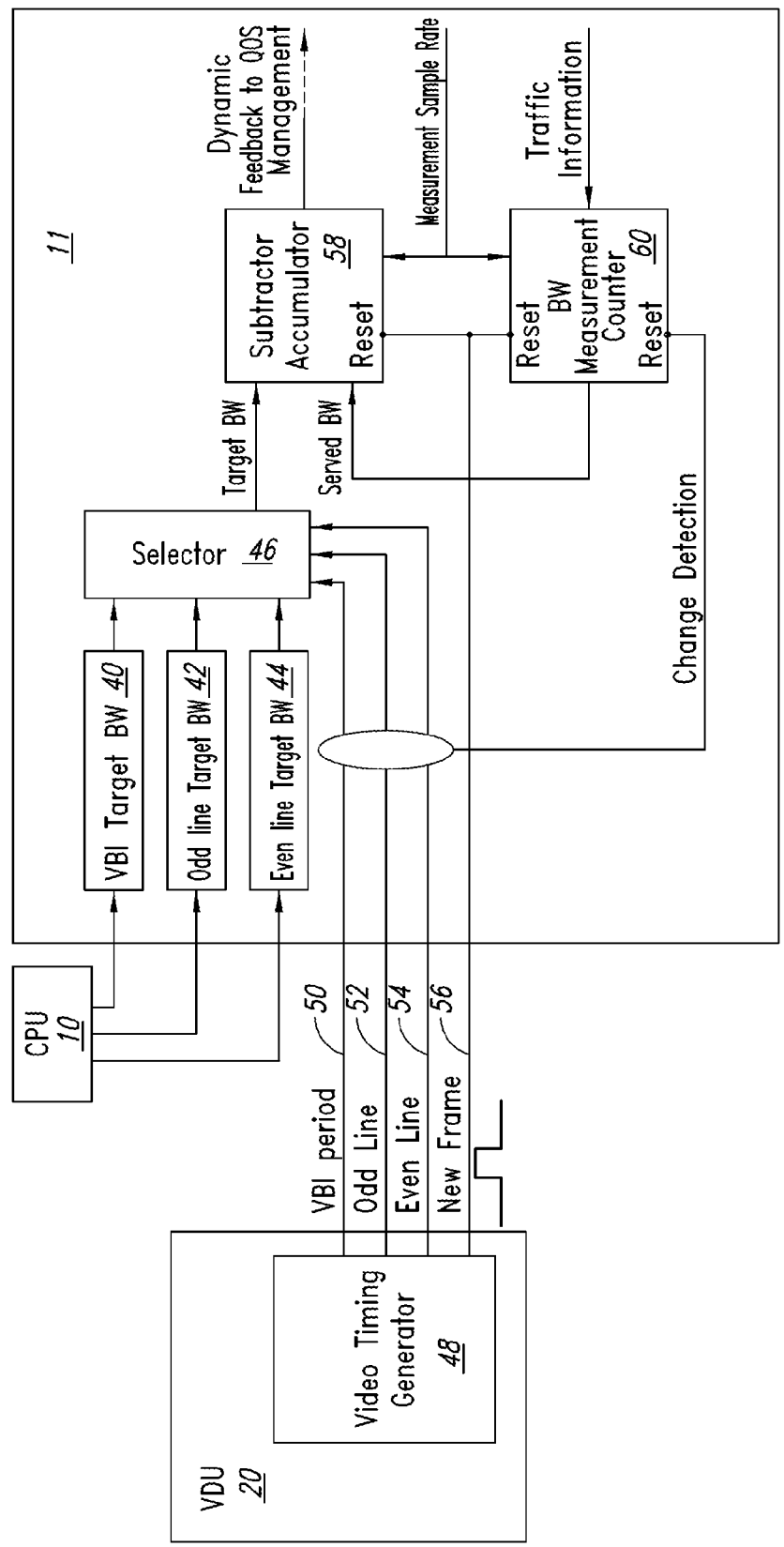
FIG. 2 shows in more detail a video display unit and interface of a network on chip.

Reference is made to FIG. 2, which shows the interaction of the VDU 20 and the CPU 10 with an interface 11 of the NoC 4 for the traffic shown in FIG. 4. The CPU 10 provides a first output, which is the VBI target bandwidth 40, a second output, which is the odd line target bandwidth 42 and a third output, which is the even line target bandwidth 44. These are the corresponding target values 132, 134, 136, shown in FIG. 4b. These values provide inputs to a selector 46. Depending on a control signal (which will be described later), one of these bandwidth values will be output by the selector 46. This will be the current target bandwidth.

The VDU 20 has a video timing generator 48. The video timing generator 48 is configured to provide a VBI period output 50, an odd line period output 52, an even line period output 54, and a new frame output 56. The VBI period output 50, the odd line output 52, and the even line output 54 are provided as control inputs to the selector 46. Depending on which of these outputs is active will control which of the target bandwidths are output by the selector 46. For example, if it is the VBI period, then the VBI target bandwidth 40 will be output by the selector 46. Likewise, if it is the odd line output which is active, then the odd line target bandwidth 42 will be output by the selector 46. If the even line output 54 is active, then the even line target bandwidth 44 will be output by the selector 46.

The target bandwidth value output by the selector 46 is received by a subtractor accumulator 58. The subtractor accumulator 58 receives information on a served bandwidth from a bandwidth measurement counter 60. The bandwidth measurement counter 60 and the subtractor accumulator 58 are configured to be reset when a new frame output 56 goes active. Accordingly, the subtractor accumulator 58 and the bandwidth measurement counter 60 are configured to receive the new frame output 56 from the VDU 20. In some embodiments, a pulse is provided at the beginning of a frame. This pulse will reset the subtractor accumulator 58 and the bandwidth measurement counter 60.

The subtractor accumulator 58 and the bandwidth measurement counter 60 are configured to receive a measurement sample rate. This acts as a clock. The bandwidth measurement counter 60 is also configured to receive traffic information. This may be an acknowledgement or granting of a request from the initiator.

The bandwidth measurement counter has a second reset. Whenever there is a change between the VBI period, odd line, and even line states, the bandwidth measurement counter will be reset.

The subtractor accumulator 58 is configured to provide a dynamic feedback to the quality of service manager. In particular, the subtractor accumulator will over a given period compare the served traffic with the target bandwidth (s). In this embodiment, the given period may be a frame. The feedback provided by the subtractor accumulator thus allows dynamic QoS to be achieved. The QoS management may be any suitable QoS management such as mentioned previously.

The arrangement of FIG. 2 may be used in order to achieve the regulated traffic output or similar to that shown in FIG. 4b. This is achieved by the new frame indication output by the VDU being used to reset the subtractor accumulator 58 and the bandwidth measurement counter 60.

The reset (i.e., the new frame indicator) is provided under the control of the initiator itself. Thus, as shown in FIG. 2, the VBI target bandwidth value 40 is output by the selector 46 during the VBI period. Likewise, the odd line target bandwidth value 42 is output by the selector 46 in the odd line period, and the even line target bandwidth value 44 is output by the selector in the even line period. This target bandwidth value is output by the selector to the subtractor accumulator 58 which controls the target value or quality of service value applied to the respective traffic from the VDU.

Thus three target bandwidths are provided. These target bandwidths may be for the VBI, odd lines, and even lines. To manage the quality of service, the target bandwidth value may be switched just before the corresponding period, and the bandwidth counter may be reset at the beginning of each period.

The management of the regulation may be under the control of the initiator or source itself based on for example signals coming from the video timing generator.

Thus in some embodiments more than one different quality of service may be used. The quality of service may be defined in terms of average bandwidth over a period. The quality of service may be programmed by application software and dynamically selected by the hardware. In the example previously discussed, a VBI target bandwidth may be provided which attempts to spread the prefilling peak over the full VBI period. A second quality of service may relate to the active line average bandwidth. Some embodiments, such as previously described, may have different targets set for even and odd lines. Alternatively, the same target may be set for even and odd lines.

It should be appreciated that the counters and accumulator in some embodiments will be reset every time a new quality of service value is applied.

In some embodiments, the regulation is provided under the control of the initiator or master. The initiator or master uses for example the information provided by the video timing generator to provide this regulation.

The peak of traffic may happen if the reset or target bandwidth switching does not occur before each separated video period. This unnecessary peak traffic may disturb other real time traffic and accordingly may be avoided in some embodiments.

The management of the regulation is done autonomously by the master or initiator.

In embodiments for traffic such as shown in FIG. 3b, the arrangement of FIG. 2 may be simplified such that the target bandwidth does not change but is rather the same. Where the target bandwidth does not change, the CPU outputs and selector may be omitted, at least as far as the control of the quality of service is concerned. In order to avoid peaking of traffic, the quality of service management may occur twice per frame; once before the vertical blanking interval and once before the first active line.

Figure 6A:
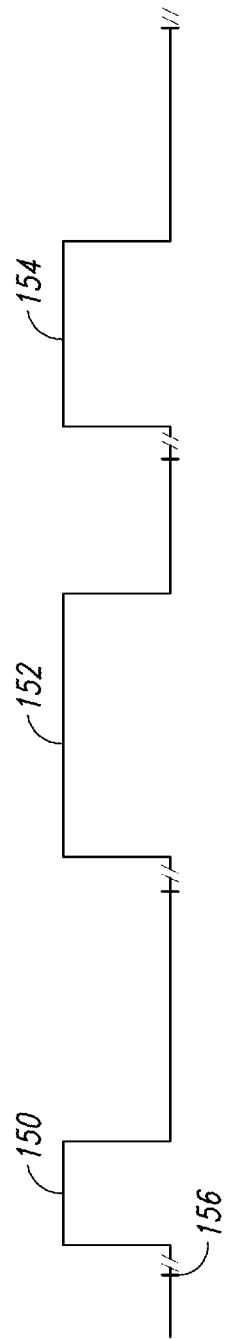
FIGS. 6a and 6b show video decoder traffic.
Figure 6B:
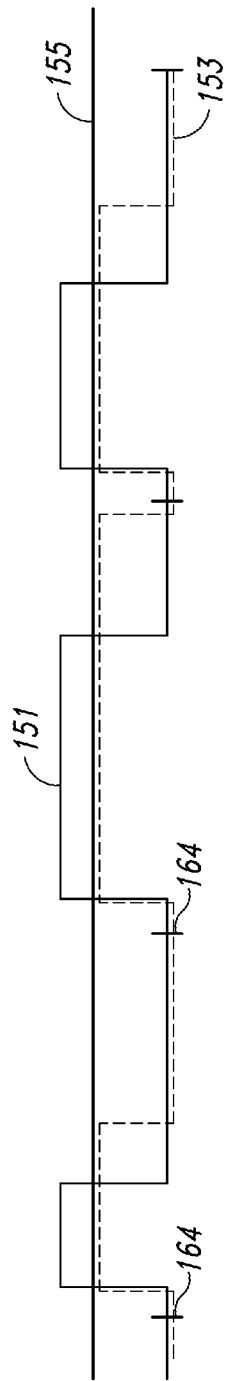

Reference is made to FIGS. 6a-6b, which show video decoder traffic. This is an example of CPU driven traffic. The native traffic is shown in FIG. 6a. With this type of traffic, the characteristics of the frame will be dependent on the data. In FIG. 6a, the first frame 150 is easy to decode. Accordingly, the 'high' traffic period is short. In contrast, the second frame 152 is more complex to decode. Accordingly, the traffic stays 'higher' for a long time. The third frame 154 is of medium complexity. The traffic height will depend on the video decoder processing frequency. The frames have periods where there is no or low traffic. Prior to the occurrence of each frame is an event 156. After the event and before the traffic goes high may be the decoder pre processing time. The events may be spaced by a period which corresponds to the video vertical frequency, that is the period of the decode tasks.

In embodiments, the regulation should attempt to achieve a target bandwidth 155 which corresponds to the bandwidth for decoding the most complex expected frame. In some embodiments, the extra traffic is not necessary and may generate issues on real time initiators. This may be for example where the system latency increases. In some embodiments, the traffic is regulated as shown in FIG. 6b. The regulated traffic is referenced 153 and is shown along with the native traffic 151. The regulated traffic reduces the peak traffic level to that of the target traffic.

The regulation counters may be reset once per frame. In some embodiments, the regulation counters may be reset at the start and/or end of the decode task. The reset time for the bandwidth counters is referenced 164 and occurs once a frame at the end or start of the decode task.

It should be appreciated that, similar to the situation shown in FIGS. 3c and 4c, if the reset does not occur before the start of the decode, the traffic may peak above the target value. This traffic may jeopardize the traffic for another real time traffic initiator. Some embodiments may avoid this peak.

Figure 5:
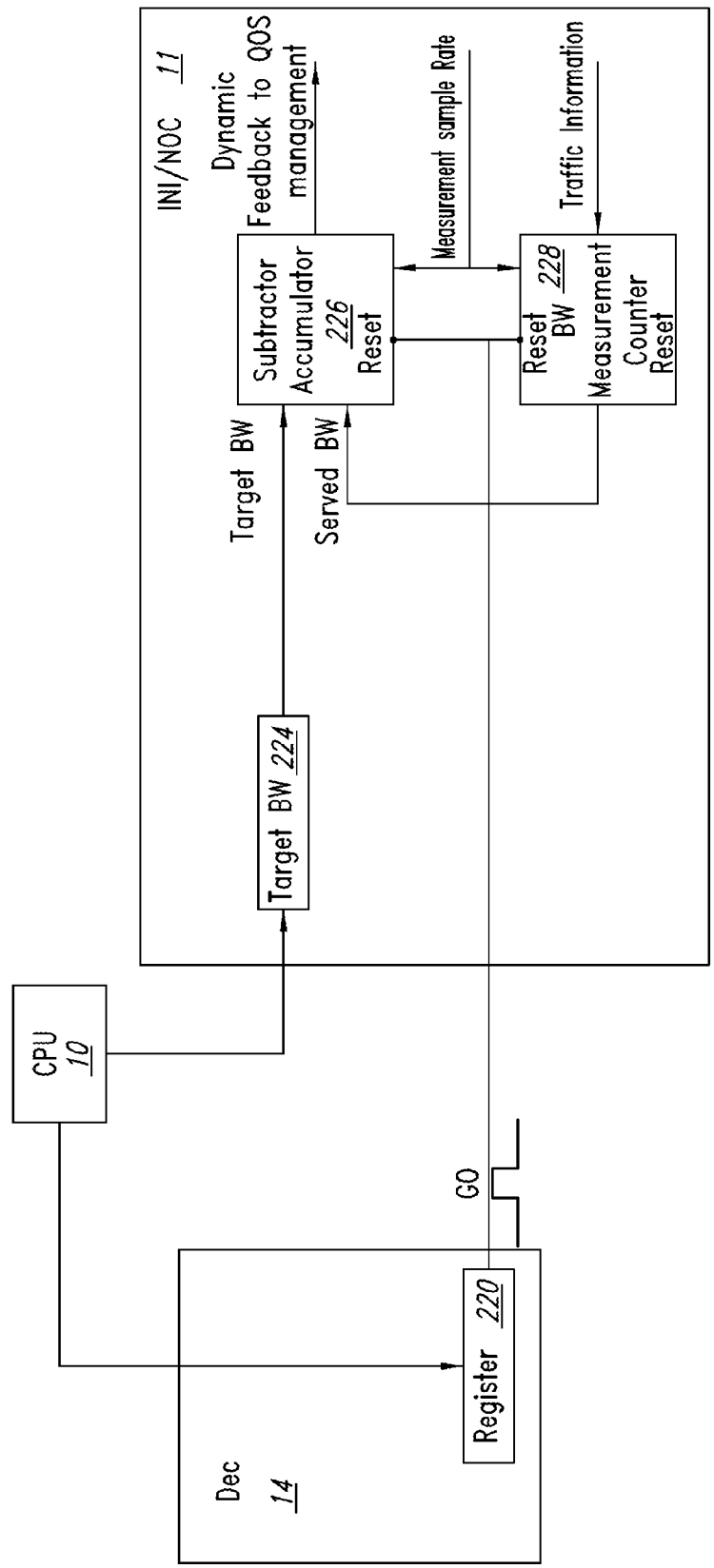
FIG. 5 shows in more detail a decoder and an interface of a network on chip.

In this regard, reference is made to FIG. 5, which shows an example of the interaction of the decoder 14 with an interface 11 of the NoC.

The decoder 14 has a register 220. The register receives an output from the CPU 10. The CPU 10 will output a target bandwidth 224 which is output to the subtractor accumulator 226. The subtractor accumulator 226 receives information on the served bandwidth from the bandwidth measurement counter 228. The bandwidth measurement counter 228 receives traffic information, as discussed in relation to FIG. 2. The bandwidth measurement counter 228 and the subtractor accumulator 226 receive a reset input from the output of the register 220. This reset is provided at the end or the start of the decode task and may be a pulse as described in relation to FIG. 2.

In the example shown in FIG. 5, the CPU 10 controls the decoder 14 and in particular the register 220. The subtractor accumulator 226 and the bandwidth measurement counter 228 receive a measurement sample rate. The subtractor accumulator 226 provides dynamic feedback to the quality of service management. The subtractor accumulator 226 and bandwidth measurement counter 228 operate in a similar manner to the components shown in FIG. 2.

Embodiments may also be used with graphic processor traffic. The graphic processor traffic may have a similar pattern to the video decoder traffic but instead of being frame based is task based. If there is no graphic task then there will be no or low traffic. The length of time for which the relatively high traffic is provided will depend on the complexity of the graphic task. Accordingly, the relatively high traffic may last for a relatively short time or may last a longer time. In some embodiments, the height of the traffic will depend on the graphic unit processing task and/or on the graphic picture format.

Again embodiments may attempt to achieve a target bandwidth. In this type of embodiment, the regulation counters would be reset just before the start of a graphic task. The target value is system and/or use dependent in some embodiments.

In some embodiments, different tasks may have different target bandwidths.

For CPU driven traffic, the control may depend on whether the traffic is regular, for example, frame based or task based. For example, for a video decoder unit, the target bandwidth may correspond to the traffic for decoding the most complex frame and is spread over a video frame period. For the graphics processor unit, the target bandwidth may correspond to the most expected traffic the system is able to accept without penalizing the real time traffic and/or video decoder traffic. The management of the regulation may be under the control of the CPU that controls the decoder/graphic tasks. In some embodiments, the management occurs once per task, i.e., just before the task is launched.

Figure 7:
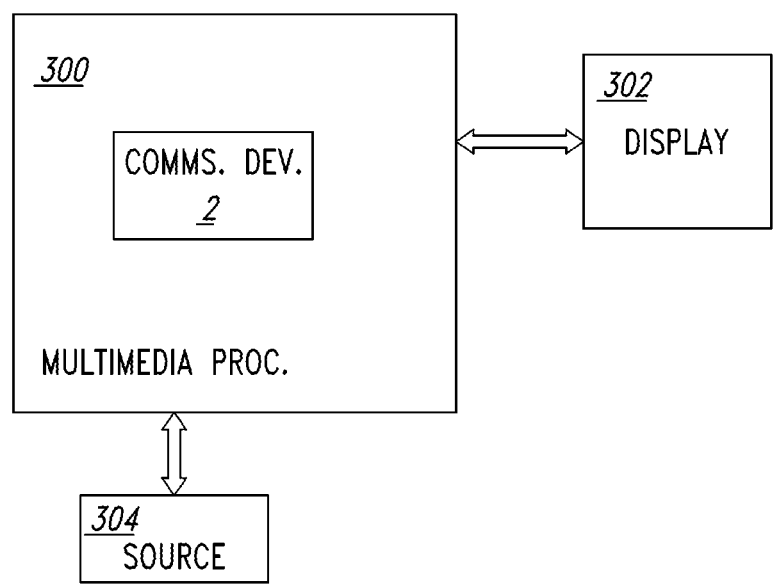
FIG. 7 shows a multimedia system.

Reference is made to FIG. 7 which shows schematically a multimedia system 500. The multimedia system comprises a multimedia processing part 300, a multimedia source 304 and a display 302. The multimedia processing part may comprise the device 2 of FIG. 1. The multimedia source may be a physical entity such as a disc or the like or may be received from an external source such as the Internet, a satellite broadcast or the like.

While this detailed description has set forth some embodiments of the present invention, the appending claims may also cover other embodiments of the present invention which differ from the described embodiments according to various modifications and improvements. Other applications and configurations may be apparent to the person skilled in the art. For example, the traffic may be other types of traffic than the example video and graphics traffic. Some embodiments have been described as using a subtractor accumulator. Alternative embodiments may use any other suitable comparison unit. Some embodiments have been described as using a bandwidth counter. It should be appreciated that alternative embodiments may use any other suitable measurement unit. Alternative embodiments may use any suitable interconnect instead of the example Network-on-Chip.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to manage bandwidth usage on an interconnect, comprising:
providing at least one target bandwidth for traffic associated with a traffic initiator;
measuring a served bandwidth on said interconnect;
resetting said measuring of served bandwidth in response to an occurrence of an event; and
issuing said traffic from said traffic initiator under control of a processor, wherein said traffic includes at least one of video decoding traffic and graphics traffic.

2. A method as claimed in claim 1, wherein said measuring uses a bandwidth counter and said resetting includes resetting said bandwidth counter.

3. A method as claimed in claim 1, comprising:
comparing served bandwidth and target bandwidth to determine said traffic.

4. A method as claimed in claim 3, comprising:
using said comparing to provide feedback to a quality of service manager.

5. A method as claimed in claim 3, wherein said comparing of bandwidth is reset in response to the event.

6. A method as claimed in claim 5, wherein said comparing of bandwidth is reset in response to one of a task beginning, a task end, a frame beginning, and a frame end.

7. A method as claimed in claim 1, comprising:
providing a plurality of target bandwidths.

8. A method as claimed in claim 1, wherein traffic provided by the traffic initiator includes video traffic.

9. A method as claimed in claim 8, comprising:
setting a first target bandwidth for a vertical blanking period; and
setting at least one further target bandwidth for an active part of a frame.

10. A method as claimed in claim 9, wherein said resetting is carried out at an end of the vertical blanking period and at an end of the active part of the frame.

11. A method as claimed in claim 9, wherein said at least one further target bandwidth includes a first target bandwidth for even lines of the frame and a second different target bandwidth for odd lines of the frame.

12. A method as claimed in claim 11, wherein said resetting is carried out at an end of the vertical blanking period, at an end of each even line, and at an end of each odd line.

13. A method as claimed in claim 1, comprising:
outputting traffic by said traffic initiator; and
controlling a traffic shape by said traffic initiator.

14. A method as claimed in claim 1, comprising:
controlling a shape of said traffic by said processor.

15. A device having an electronic arrangement, said electronic arrangement comprising:
an interconnect configured to convey traffic associated with at least one initiator, said interconnect having at least one interface configured to interface with said at least one traffic initiator, the interconnect configured to process at least one target bandwidth provided for traffic, associated with a respective traffic initiator, on said interconnect; and a measurement unit configured to measure a served bandwidth associated with said respective traffic initiator, said measurement unit configured to be reset in response to an occurrence of an event, wherein said respective traffic initiator is configured to issue traffic under control of a processor, wherein said traffic includes at least one of video decoding traffic and graphics traffic.

16. A device as claimed in claim 15, wherein said measurement unit includes a bandwidth counter.

17. A device as claimed in claim 15, comprising:
a comparing unit configured to compare said served bandwidth and said target bandwidth for said traffic.

18. A device as claimed in claim 17, wherein said comparing unit is configured to provide feedback to a quality of service manager.

19. A device as claimed in claim 17, wherein said comparing unit is configured to be reset in response to the occurrence of the event.

20. A device as claimed in claim 19, wherein said event includes one of a task beginning, a task end, a frame beginning, and a frame end.

21. A device as claimed in claim 15, wherein a plurality of target bandwidths is provided.

22. A device as claimed in claim 15, wherein said respective traffic initiator is associated with video traffic.

23. A device as claimed in claim 22, wherein a first target bandwidth for a vertical blanking period and at least one further target bandwidth for an active part of a frame are provided.

24. A device as claimed in claim 23, wherein said measurement unit is configured to be reset at an end of the vertical blanking period and at an end of the active part of the frame.

25. A device as claimed in claim 23, wherein said at least one further target bandwidth includes a first target bandwidth for even lines of a frame and a second different target bandwidth for odd lines of a frame.

26. A device as claimed in claim 25, wherein said measurement unit is configured to be reset at an end of each even line and at an end of each odd line.

27. A device as claimed in claim 15, wherein said traffic initiator is configured to output traffic and control a shape of said traffic.

28. A device as claimed in claim 15, wherein said electronic arrangement is formed on a die.

29. A device as claimed in claim 15, wherein said device is a multimedia device.

30. A method to regulate traffic on an interconnect, comprising:
providing a target bandwidth for bandwidth usage on said interconnect, said target bandwidth associated with a traffic initiator;
issuing said traffic from said traffic initiator under control of a processor, wherein said traffic includes at least one of video decoding traffic and graphics traffic;
determining a bandwidth usage on said interconnect; and
changing the target bandwidth in response to an occurrence of an event.

31. A method as claimed in claim 30, comprising:
passing data through the interconnect via a first plurality of traffic initiator interfaces and a second plurality of corresponding traffic target interfaces; and
entering an idle state in said interconnect when the associated traffic initiator does not issue traffic.

32. A method as claimed in claim 30, comprising:
pre-filling a first-in-first-out (FIFO) buffer during a vertical blanking interval (VBI);
comparing a served bandwidth to the target bandwidth to determine said bandwidth usage; and
resetting a counter associated with the comparing when the idle state in the interconnect is entered.

33. A method as claimed in claim 30, wherein said changing the bandwidth includes reducing the bandwidth at a first time and increasing the bandwidth at a second time.

* * * * *